US006519825B1

(12) United States Patent
Lambert et al.

(10) Patent No.: US 6,519,825 B1
(45) Date of Patent: Feb. 18, 2003

(54) CLAMPING MECHANISM FOR FRAME ASSEMBLY

(75) Inventors: Anthony Lambert, West Bloomfield, MI (US); James W. Stone, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/615,144

(22) Filed: Jul. 13, 2000

(51) Int. Cl.[7] .......................... B25B 27/14; B25B 1/20; B23P 21/00; B05C 1/20

(52) U.S. Cl. .......................... 29/281.1; 29/721; 144/58; 269/41

(58) Field of Search ................................ 29/401.1, 445, 29/464, 721, 281.1; 269/41, 42; 144/58

(56) References Cited

U.S. PATENT DOCUMENTS 3,734,381 A * 5/1973 Blevio ........................ 227/148
4,127,226 A * 11/1978 Jasper ......................... 227/69
4,247,090 A * 1/1981 Hahn et al. ................... 269/41
5,269,502 A 12/1993 Joyce
5,649,347 A * 7/1997 Cattadoris .................... 29/252

* cited by examiner

*Primary Examiner*—Gregory M. Vidovich
*Assistant Examiner*—John C. Hong
(74) *Attorney, Agent, or Firm*—Lisa M. Soltis; Mark W. Croll; Donald J. Breh

(57) ABSTRACT

A clamping head assembly for clamping a first member to a second member at a miter joint, where the clamping head assembly includes a first fence member with a first positioning edge for positioning an edge of the first member and a second fence member that is movable and includes a second positioning edge for positioning an edge of the second member. The second positioning edge is arranged at an angle with respect to the first positioning edge. Additionally, the first fence member and the second fence member are configured and arranged so that the angle is approximately bisected by the miter joint formed between the first and second members. The second fence member is movable in a direction that is approximately perpendicular to the miter joint, whereby a normal force is generated upon the miter joint. Furthermore, the present invention also relates to a frame making machine that includes the clamping head assembly just described.

20 Claims, 3 Drawing Sheets

CLAMPING MECHANISM FOR FRAME ASSEMBLY

BACKGROUND OF THE INVENTION

The present invention relates generally to a machine for joining two members at a miter joint, a clamping head assembly for use in such a machine, and a method of retrofitting an existing joining machine to include the present clamping head assembly. More particularly, the preferred embodiment of the present invention relates to a frame making machine used for joining two frame members at a miter joint, where the machine includes a clamping head assembly with two fence members, at least one of which is movable, which are used to align the frame members in the proper orientation. The present invention also relates to such a clamping head assembly, as well as to retrofitting a machine that includes a conventional head assembly with the present head assembly. It should be noted that although the preferred embodiments of the present invention will be shown and described as being intended for use in the frame making industry, uses of the present invention in other industries that require members to be joined together at a miter joint are also contemplated as being within the scope of the invention, for example the woodworking industry.

A miter joint is a corner joint formed by fitting two members together at their respective edges, wherein each edge is cut at some angle; the line defined at the joint between the adjacent edges is the miter angle. Conventionally, for adjacent edges cut at the same angle, if the included angle between the two members is 90 degrees, the miter angle will be 45 degrees, and if the included angle is 60 degrees, the miter angle will be 30 degrees. Therefore, a miter angle by definition is an oblique angle.

Machines for joining two frame members at a miter joint are known in the art. One popular machine, which is shown in an exploded view in FIG. 1, is the "Mitre-Mite VN 4 Electronic," which is manufactured and distributed by Alfamachine-ITW/AMP of Vernon Hills, Ill. The frame making machine 10 includes a work table 12 with a preferably horizontal work surface 14. Briefly, as known to those of ordinary skill in the art, the machine 10 operates as follows. First, one frame member is aligned along each one of the two fence members (22, 24) with a miter joint therebetween. Next, the frontal clamp 18 (optional) moves horizontally in a direction that is generally coincident with the miter joint, and pushes each of the two frame members against its respective fence member (22, 24). Third, the vertical clamp (20) engages the frame members from the top, pushing them downwardly against the work surface 14. Finally, the two frame members are nailed together at the miter joint by one or more nails (e.g., V-nails, corrugated fasteners or other fasteners) that are driven upwardly into the miter joint from a nail driving mechanism that is seated below the work surface 14. After the nailing operation, the two frame members (which are now a single unit) can be removed from the machine since they have been joined together at the miter joint.

Since the present invention relates primarily to the methods and apparatuses used to clamp the frame members in place, these features of the prior art machine will be described next in more detail. The machine 10 includes three primary clamping subassemblies: (1) a stationary clamping assembly 16; (2) a movable frontal clamp assembly 18; and (3) a movable vertical clamp assembly 20. It should be noted that since these features are known to those of ordinary skill in the art, only the major components of each subassembly will be described below.

The stationary clamping assembly consists primarily of two stationary fence members 22 and 24 that are relatively rigidly affixed to the work surface 14 by a plurality of screws 26 extending through a plurality of associated holes 28. The holes 28 are in the form of elongated slots to allow for some adjustment of the positioning of the stationary fence members 22, 24. Knobs 30 are useful for adjusting the vertical angle of the edge of the fence members to better accommodate and achieve a tight fit between frame members having angled or non-uniform edges. A shown in the FIG. 1 view, the inner (or left) side of each of the stationary fence members defines a positioning edge upon which a respective edge of one of the frame members intended to be joined together is seated against.

The second subassembly, the movable frontal clamp assembly 18, includes a movable frontal clamp member 32, which is configured to move within track 34. The position of the frontal clamp member 32 may be varied by moving the securing knob 36 to another one of the holes 38. In operation, the movable front clamp member 32 is moved from a first position in which it is drawn backward (toward the left-hand side of FIG. 1) to a second position (toward the right-hand side of FIG. 1) in which it is clamping against the frame members intended to be joined together. The direction of travel of the frontal clamp member 32 is essentially coincident with the miter between the two frame members being joined together.

The third subassembly, the movable vertical clamp assembly 20, includes a pressure plate 37 that is attached to a rod 39. The rod 39 is attached to a support structure 40, which is in turn connected to two cylinders 42. The cylinders 42 are rigidly affixed to the work surface 14 from below so that the attachment plates 44 are below the work surface 14 and the cylinders 42 extend through holes 45 to be situated above the work surface. If necessary, the horizontal location of the pressure plate 37 may be adjusted by loosening handle 46, and then sliding the threaded dowel 48 within the slot 50. The vertical height of the pressure plate 37 may be adjusted by manipulating the other handle 52. In operation, the cylinders 42 are withdrawn to push the pressure plate 37 downwardly upon the top of the frame members being joined together at the miter joint. In this manner, the frame members are firmly held down when the fastener(s) (e.g., V-nails, corrugated fasteners) are inserted from below.

One common problem with many frame assembly machines of the prior art, such as the one described above, is that the two frame members being joined together may not be properly held together at the miter joint. There may be a slight space between the two frame members at the miter joint prior to nailing. If this is the case, when the frame members are nailed together, there will be an unsightly gap between the two frame members at the joint. That is, the miter joint may be too wide along its entire length, resulting in a visible air space along the entire length of the miter joint, or the miter joint may be uneven, whereby a portion of the joint has a visible air space and another portion is tight with no visible air space. Neither of these two situations is desirable since the intent is to arrive at a tight miter joint with no visible gap between the two frame members.

Accordingly, one object of the present invention is to provide an improved frame assembly machine which is capable of consistently making a tight miter joint.

Another object of the present invention is to provide a clamping head assembly for use with a frame assembly machine whereby the resulting miter joints are tight.

A third object of the present invention is to provide a clamping head assembly for use with a frame machine where the assembly includes at least one movable fence member for properly positioning the frame member within the machine prior to the nailing operation.

A fourth object of the present invention is to provide a clamping head assembly that applies a force to the frame members being joined together at a miter joint, where that force is applied in a direction that is approximately perpendicular to the miter joint.

An additional object of the present invention is to provide a method of retrofitting an improved clamping head assembly upon an existing frame assembly machine.

These and other objects of the present invention are discussed or will be apparent from the following detailed description of the present invention.

BRIEF SUMMARY OF THE INVENTION

The above-listed objects are met or exceeded by the present frame assembly machine, which features a clamping head assembly that provides an additional clamping force for maintaining the frame members in position prior to being joined together at a miter joint, where that additional clamping force is applied in a direction that is approximately perpendicular to the miter joint. In the preferred embodiments, the additional clamping force is realized by providing a movable fence member that cooperates with a stationary fence member to retain the two frame members in the proper position prior to being nailed together.

More specifically, the present invention provides a clamping head assembly for clamping a first member to a second member at a miter joint, where the clamping head assembly includes a first fence member with a first positioning edge for positioning an edge of the first member and a second fence member that is movable and includes a second positioning edge for positioning an edge of the second member. The second positioning edge is arranged at an approximately right angle with respect to the first positioning edge. Additionally, the first fence member and the second fence member are configured and arranged to that the approximately right angle is approximately bisected by the miter joint formed between the first and second members. The second fence member is movable in a direction that is approximately perpendicular to the miter joint, whereby a normal force is generated upon the miter joint. Furthermore, the present invention also relates to a frame making machine that includes the clamping head assembly just described.

Another aspect of the present invention relates to retrofitting an existing frame making machine with an improved clamping head assembly. In particular, the invention relates to a method of retrofitting a frame making machine that originally includes a primary work surface (preferably generally horizontal) and two stationary fence members for positioning first and second frame members intended to be joined together at a miter joint, where the two stationary fence members are seated upon the primary work surface. The first step of the method involves removing at least one of the stationary fence members from the frame making machine. The second step involves installing at least one movable fence member upon the frame making machine, where the movable fence member is capable of being moved in a direction that is generally perpendicular to the miter joint between the first and second frame members.

BRIEF DESCRIPTION OF THE SEVERAL VIEWS OF THE DRAWINGS

Preferred embodiments of the present invention are described herein with reference to the drawings wherein.

DETAILED DESCRIPTION OF THE INVENTION

Figure 1:
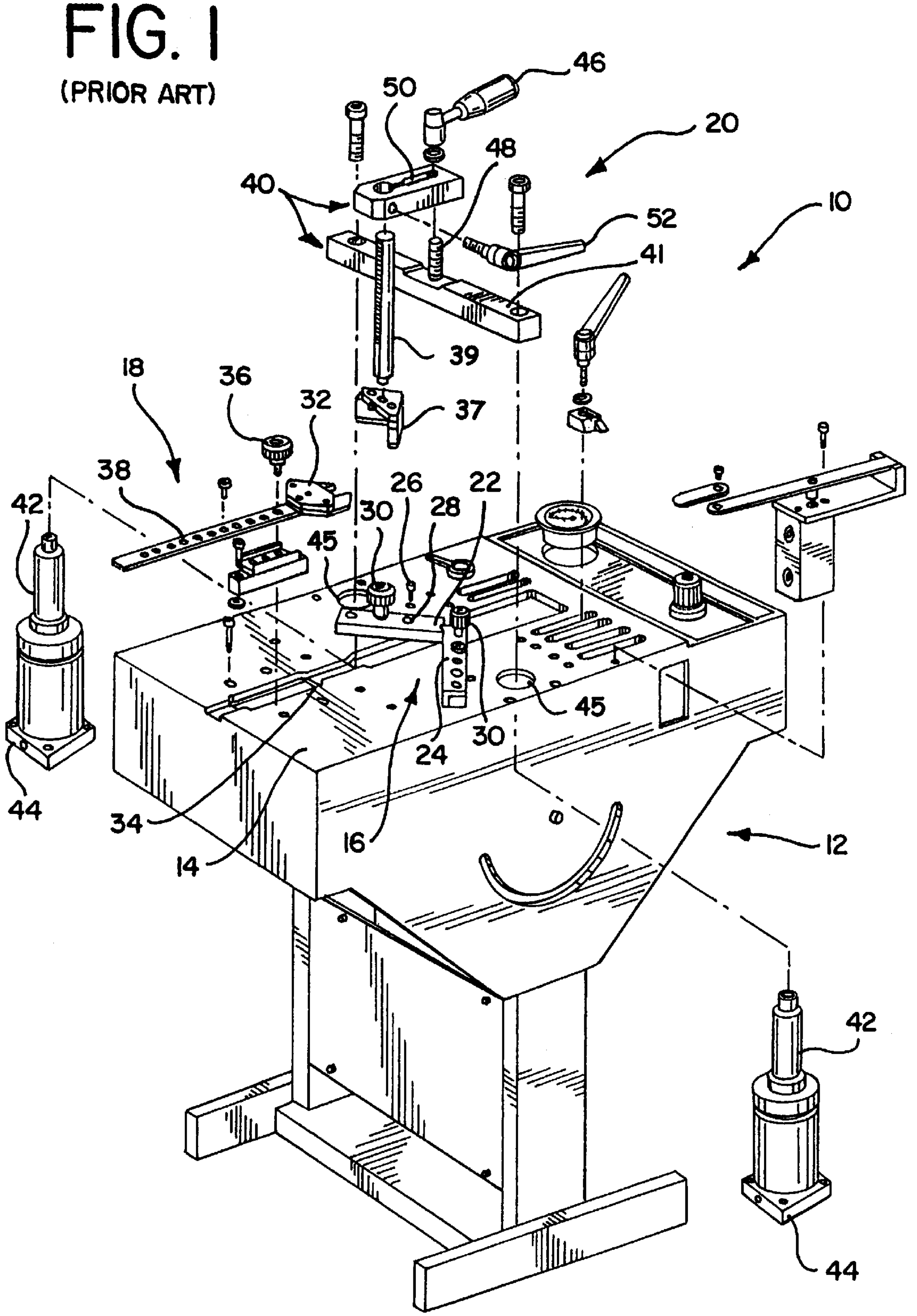
FIG. 1 (PRIOR ART)
FIG. 1 is an exploded view of a prior art frame assembly machine, including a prior art clamping head assembly consisting of two stationary fence members.
Figure 2:
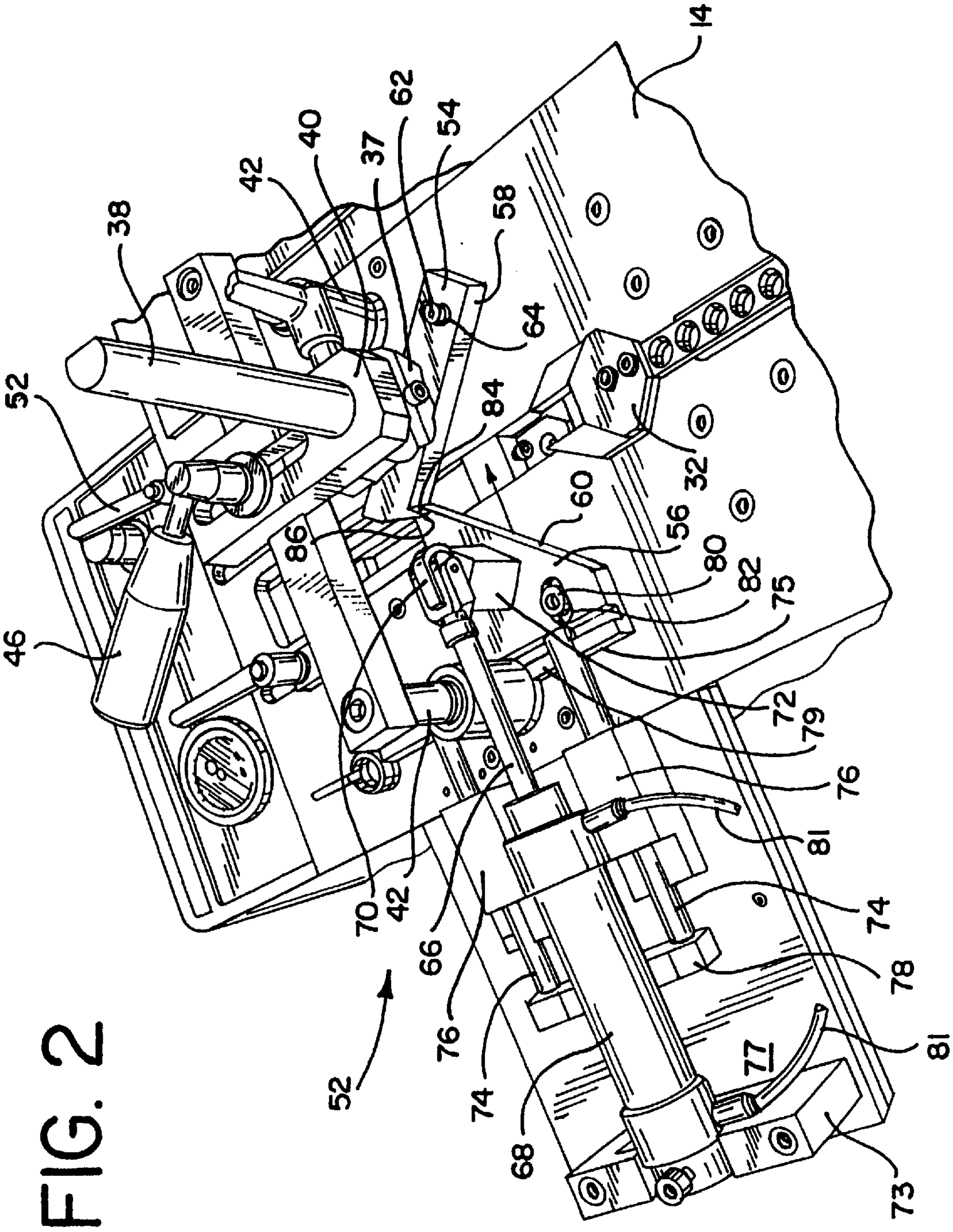
FIG. 2 is a top perspective view of the first embodiment of the clamping head assembly of the present invention.

Referring now to FIG. 2, a first embodiment of the present clamping head assembly will be described. It should be noted that features of FIG. 2 that are also found in the prior art device of FIG. 1 will be numbered with the same numbers used in FIG. 1. It should also be noted that in FIG. 2 a portion of the pressure plate 37 has been cut away to allow for a better view of the components below this plate.

In the FIG. 2 embodiment, the clamping head assembly 52 includes two fence members—a stationary fence member 54 and a movable fence member 56. The stationary fence member 54 includes a positioning edge 58 for aligning the edge of one of the frame members intended to be joined at a miter joint, and the movable fence member 56 also includes a positioning edge 60 for aligning the other frame member. The stationary fence member 54 is preferably rigidly affixed to the work surface 14 via several bolt and slot arrangements, only one of which is shown. These arrangements each include a bolt, such as bolt 62, and a slot, such as slot 64. The elongated slots 64 allow for some adjustment of the position of the stationary fence member 54.

In this preferred embodiment, the movable fence member 56 is attached to a cylinder rod 66 of a pneumatic cylinder 68 via a pivotable connection 70 made through a block 72. The block 72 is rigidly affixed to the top of the movable fence member 56. One end of the cylinder 68 is preferably affixed to a cylinder base 73 such that the cylinder extends horizontally from the base so that the cylinder rod 66 is aligned with the pivotable connection 70. Instead of using a pneumatic cylinder to move the movable fence member 56, it is also contemplated that electromechanical means, e.g., electronic, mechanical, pneumatic controls and parts, may be used.

Two guide rods 74, each of which are slidable between a corresponding guide block 76, are preferably provided to guide the movable fence member 56 along a straight horizontal path that is perpendicular to the miter joint that will be found between the two frame members being joined together. The guide rods 74 are preferably notched at areas 75, which is a simple method of affixing them to the raised shoulder 79 of the movable fence member 56. A stop bar 78 is preferably provided on the ends of both guide rods 74 in order to prevent the rods from extending too far. The guide blocks 76 and the cylinder base 73 are preferably rigidly affixed to a supplemental work surface 77.

Optionally, additional guidance for the movable fence member 56 may also be provided by a pair of bearings 80 seated within a pair of slots 82 (only one of which are shown). It should be noted that each bearing 80 passes through one of the slots 82, and is affixed to the work surface 14, and this bearing/slot combination allows for the movable fence member 56 to slide across the work surface 14.

Another optional feature of the present invention is the inclusion of a ridge 84 on the stationary fence member 54.

The ridge functions to align the frame members prior to clamping and fastening the members together. The ridge further facilitates the centering of the fastener with respect to the miter joint. A notch 86 may also be included the movable fence member 56. The notch provides clearance for the moveable fence to move inwardly toward the stationary fence, while applying pressure perpendicularly to the miter joint. This notch/ridge configuration thereby facilitates the formation of the miter joint.

In operation, the steps related to the clamping head assembly of the present invention are simply incorporated into the operating steps of prior art frame making machines. Thus, first the operator sets one frame member against each of the positioning edges 58 and 60. Next, the movable frontal clamp 32 moves towards the frame members in a direction that is essentially coincident with the miter joint. Third, the cylinder 68 activates to move the movable fence member 56 in the direction of the arrow, creating a force upon the frame members that is approximately perpendicular to the miter joint. Such a force is useful in reducing the size of the gap between frame members at the miter joint. Next, the pressure plate 36 is lowered, creating a downward force upon the frame members. Finally, the frame members are affixed together at the miter joint, for example, by one or more fasteners that are driven upwardly from below the work surface 14. Accordingly, the two frame members are now affixed together at a miter joint, and can be removed from the machine.

Another important aspect of the present invention is that the present clamping head assembly may be retrofitted to a frame making machine with two stationary fence members, such as that shown and described above while referring to FIG. 1. The basic retrofitting procedure is as follows. First, one of the stationary fence members, such as fence member 22 of FIG. 1, is removed from the machine. Then, the movable fence member 56 is positioned upon the primary work surface 14 in the appropriate area. The movable fence member 56 preferably includes the block 72, but the fence member is not connected to the cylinder rod 66 or the guide rods 74 yet. Either before or after the movable fence 56 is installed, a supplemental work surface (such as surface 77 of FIG. 2) is affixed to the machine. Upon the supplemental work surface 77 are seated the components used to move the movable fence member 56, such as the pneumatic cylinder 68, the guide blocks 76, etc. At this point the guide rods 74 are connected to the movable fence member 56 via the notched area 75 and the raised shoulder configuration 79 mentioned above. The cylinder rod 66 is connected as well, via the pivotable connection 70. The pneumatic tubes 81 are then connected to the cylinder 68, and the machine is in condition to be operated. If desired, the other stationary fence member (member 24 of FIG. 1) may also be replaced by a fence member with a ridge (such as member 54 of FIG. 2 with ridge 84) in order to facilitate the substantial alignment of the frame members prior to clamping and fastening operations.

A second embodiment of the present invention will now be described while referring to the schematic view of the top of the machine shown in FIG. 3. Once again, like components from FIGS. 1 and 2 will be numbered with the same index numbers in FIG. 3.

Figure 3:
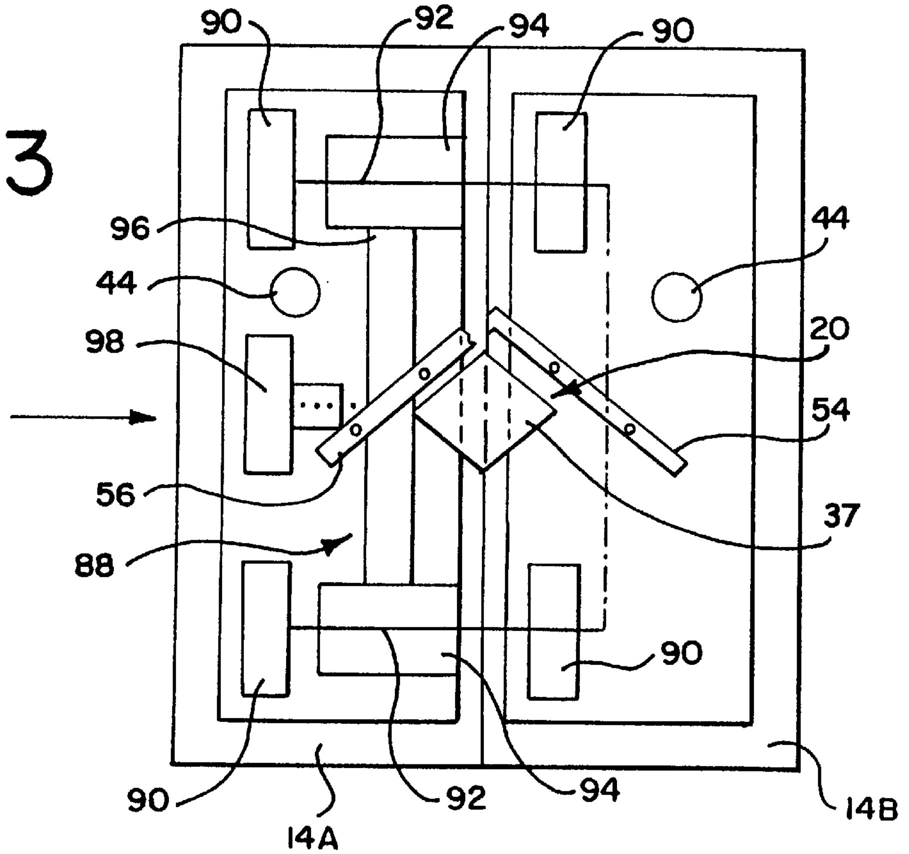
FIG. 3 is schematic view of a second embodiment of the clamping head assembly of the present invention.

One of the main features of the FIG. 3 embodiment is that the work surface 14 is split into two sections—section 14A and section 14B. In this embodiment, the movable fence member 56 is rigidly affixed to work surface section 14A, and the entire section 14A of the work surface is configured to move in the direction of the arrow, i.e., in a direction that is approximately perpendicular to the miter joint between the two frame members.

In order to be able to move, the movable section 14 of the work surface is connected to a support structure 88 that is situated below the work surface 14. The support structure 88 preferably includes four mounting blocks 90, which are used to mount two rods 92. A bearing 94, such as a Thompson bearing, is slidably mounted upon each rod 92. The tops of the bearings 94 are rigidly connected to the bottom of section 14A of the work surface. The bearings 94 are preferably connected to each other via a bar 96, which is connected near a center portion thereof to a cylinder 98. The cylinder 98 is configured to move the bar 96 in the direction of the arrow, and accordingly also moves the bearings 94 and work surface section 14A in the same direction, since these components are all rigidly connected to the bar 96.

In the FIG. 3 embodiment, as well as in the FIG. 2 embodiment, only a slight movement of fence member 56 is required to provide sufficient pressure upon the miter joint. For example, travel of approximately 0.25 inches is sufficient. Since only a minimal amount of movement required, it is also contemplated that section 14A of the work surface may be hingedly mounted to a mechanism for moving it with respect to the other section (section 14B). Although movable fence member 56 would then be moved in an arc (instead of perfectly perpendicular to the miter joint as in the embodiments of FIGS. 2 and 3), the movement distance is so minimal that it can be considered to be moving in a straight line.

In the FIG. 3 embodiment, the movable vertical clamp assembly 20, which includes the pressure plate 37, is preferably configured in a similar manner to that shown in FIG. 1. However, since section 14A of the work surface is movable (along with the associated cylinder 42), the left side of the horizontal bar 41 of the support structure 40 needs to be connected to the left cylinder 42 with a horizontally slidable connection, such as with a bearing. In the alternative, the components supporting the pressure plate 37 may all be positioned upon the movable section 14A, in which case a horizontally slidable connection between horizontal bar 41 and the left cylinder 42 is unnecessary.

The FIG. 3 embodiment may also be retrofitted to an existing frame making machine, such as machine 10 shown in FIG. 1. Basically, the work surface 14 (FIG. 1) is removed from the work table 12, and is divided into two sections 14A and 14B (FIG. 3) along a line that is coincident with the location of the miter joint between the two frame members intended to be joined together. The support structure 88 is installed within the work table 12, section 14A of the work surface is seated above the support structure, and the bottom of section 14A is connected to the tops of bearings 94. The other section of the work surface, section 14B, is then reinstalled upon the work table 12 so that it remains stationary with respect to the work table. The fences 54 and 56 may be installed upon their respective sections (14A and 14B) of the work surface either before or after the work surface is reinstalled upon the table 12. The movable vertical clamp assembly 20 (FIG. 1) may also be reinstalled upon the appropriate work surface section 14A (or upon both sections 14A and 14B if desired) either before or after the section(s) have been reinstalled upon the table 12.

Figure 4:
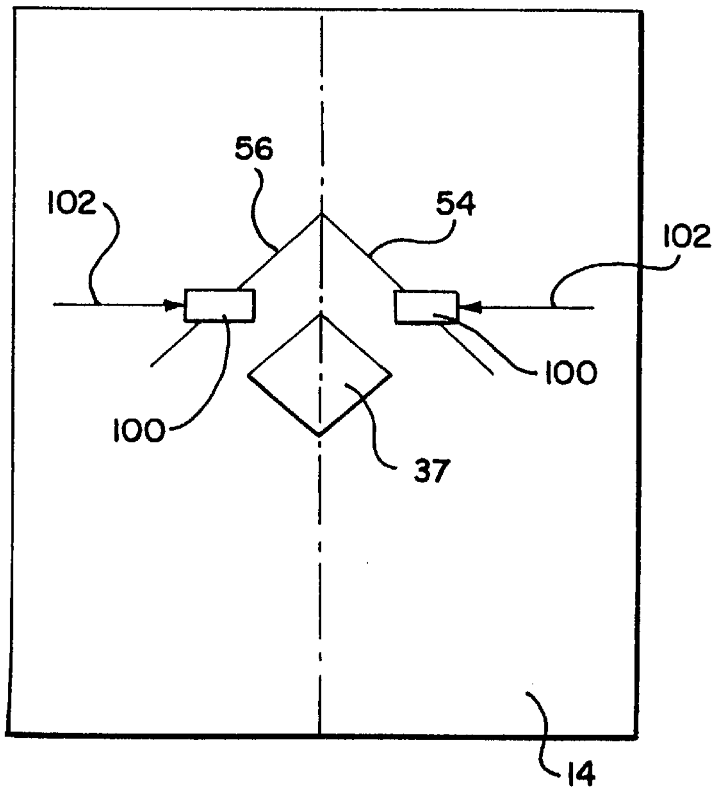
FIG. 4 is a schematic view of a third embodiment of the clamping head assembly of the present invention.

Referring now to FIG. 4, a schematic view of the top of the machine of a third embodiment is shown. In this embodiment, both fences 54 and 56 are fixed to the work surface 14, and the additional pressure is applied by pads 100. In this schematic, arrows 102 represent cylinders, or other similar pressure means, that apply pressure to the pads 100 in the direction of the arrows. As in the other embodiments, each of the pads 100 apply pressure in a direction that is approximately perpendicular to the miter joint between the two frame members being joined together. In this way, the frame members are moved together to form the miter joint, while being held against the work surface, resulting in a tighter miter joint. Preferably, the cylinders 102 are arranged to apply forces in the vertical direction as well as in the horizontal direction. This combination force can be accomplished by arranging the cylinders 102 at an angle with respect to the work surface 14. The suggested range for the angle is between 30° and 60°, with 45° being most preferred. This embodiment may also be retrofitted upon an existing machine, such as the machine of FIG. 1.

While particular embodiments of the clamping head assembly and method of retrofitting a frame making machine to include the assembly have been shown and described, it will be appreciated by those skilled in the art that changes and modifications may be made thereto without departing from the invention in its broader aspects and as set forth in the following claims.

What is claimed is:

1. A clamping head assembly for clamping a first member to a second member at a miter joint, said first and second members defining a plane, the clamping head assembly comprising:

a first fence member including a first positioning edge for positioning an edge of the first member; and a second fence member including a second positioning edge for positioning an edge of the second member, said second positioning edge being arranged at an angle with respect to said first positioning edge, said first fence member and said second fence member being configured and arranged so that said angle is approximately bisected by the miter joint formed between said first and second fence members, said second fence member being movable within said plane in a direction that is approximately perpendicular to the miter joint, whereby a normal force is generated upon the miter joint.

2. The clamping head assembly of claim 1, further comprising a movable frontal clamp member for exerting a force upon the first and second members in a direction that is essentially coincident with the miter joint.

3. The clamping head assembly of claim 1, further comprising a vertical clamp member for exerting a downward force upon the first and second members.

4. The clamping head assembly of claim 1, wherein said second fence member includes a notch and said first fence member includes a ridge, whereby said notch and said ridge facilitate the movement or alignment of said first and second fence members.

5. The clamping head assembly of claim 1, wherein said first fence member is fixed to be relatively stationary with respect to said second fence member.

6. The clamping head assembly of claim 1, wherein said angle that is approximately bisected by the miter joint is a right angle.

7. A clamping head assembly for clamping a first member to a second member at a miter joint, said first and second members defining a plane, the clamping head assembly comprising:

a first fence member including a first positioning edge for positioning an edge of the first member;

a second fence member including a second positioning edge for positioning an edge of the second member, said second positioning edge being arranged at an angle with respect to said first positioning edge, said first fence member and said second fence member being configured and arranged so that said angle is approximately bisected by the miter joint formed between said first and second members; and means for applying a force to the first and second members in a direction that is within said plane and is approximately perpendicular to the miter joint.

8. The clamping head assembly of claim 7, wherein said means for applying a force includes a pad and a cylinder.

9. The clamping head assembly of claim 7, wherein said means for applying a force includes a first pad and a first cylinder for applying a force near the first member and a second pad and a second cylinder for applying a force near the second member.

10. The clamping head assembly of claim 9, wherein said first cylinder and said second cylinder are both arranged at an angle within the range of 30° to 60° with respect to a generally horizontal work surface.

11. The clamping head assembly of claim 7, wherein said angle that is approximately bisected by the miter joint is a right angle.

12. A frame making machine for joining a first frame member to a second frame member, said first and second frame member defining a frame plane, the machine comprising:

a work table with a generally horizontal work surface;

a clamping head assembly positioned upon the work table for clamping the first frame member to the second frame member at a miter joint, the clamping head assembly including:

a first fence member including a first positioning edge for positioning an edge of the first frame member; and a second fence member including a second positioning edge for positioning an edge of the second frame member, said second positioning edge being arranged at an angle with respect to said first positioning edge, said first fence member and said second fence member being configured and arranged so that said angle is approximately bisected by the miter joint formed between said first and second fence members, said second fence member being movable in a direction within said frame plane that is approximately perpendicular to the miter joint, whereby a normal force is generated upon the miter joint.

13. The frame making machine according to claim 12 wherein the second fence member is connected to a cylinder such that said cylinder moves said second fence member along said work surface toward said first fence member.

14. The frame making machine according to claim 12, wherein:

said work surface of said work table is divided along a line parallel to the miter joint into a first work surface and a movable work surface, with said movable work surface being movable in a generally horizontal direction that is approximately perpendicular to the miter joint;

said first fence member is relatively rigidly fixed to said first work surface; and said second fence member is relatively rigidly fixed to said movable work surface.

15. The frame making machine according to claim 12, further comprising:

a movable frontal clamp member for exerting a force upon the first and second frame members in a direction that is essentially coincident with the miter joint; and a vertical clamp member for exerting a downward force upon the first and second frame members.

16. The frame making machine according to claim 12, wherein said second fence member includes a notch and said first fence member includes a ridge, whereby said notch and said ridge facilitate the alignment or movement of said first and second fence members.

17. The frame making machine according to claim 13, wherein said first fence member is fixed to be relatively stationary with respect to said second fence member.

18. The frame making machine according to claim 12, further comprising first means for applying a first force to the first member and second means for applying a second force to said second member, whereby said first and second forces combine to create the normal force generated upon the miter joint.

19. The frame making machine according to claim 18 wherein said means for applying the first force includes a first pad and a first cylinder and said means for applying the second force includes a second pad and a second cylinder.

20. The clamping head assembly of claim 12, wherein said angle that is approximately bisected by the miter joint is a right angle.

* * * * *